April 9, 1929.  E. G. CHIPMAN  1,708,355
GEAR PULLER
Filed May 1, 1926
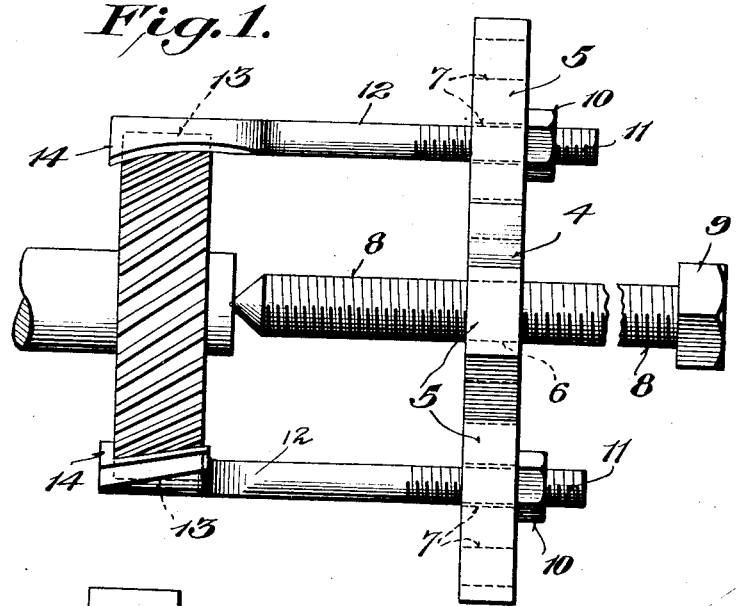
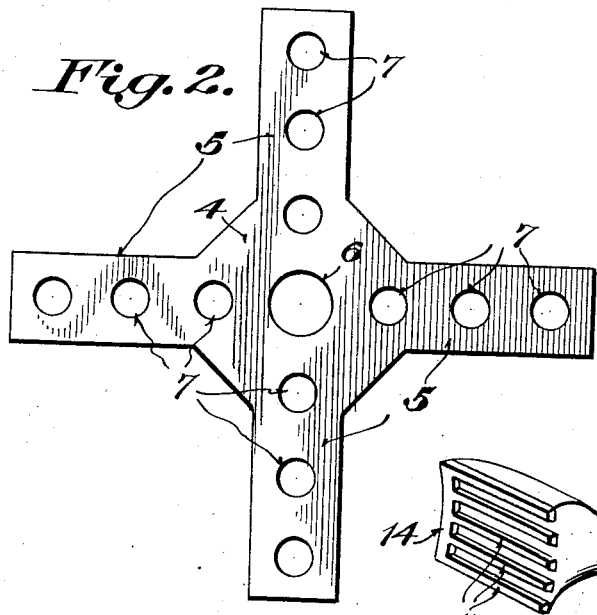
Inventor
Eddie G. Chipman,
By H. Ralph Burton,
Attorney Patented Apr. 9, 1929.

1,708,355

UNITED STATES PATENT OFFICE.

EDDIE G. CHIPMAN, OF LULING, TEXAS.

GEAR PULLER.

Application filed May 1, 1926. Serial No. 106,055.

This invention relates to devices for pulling gears, pinions, and the like from the shafts upon which they are mounted, and it pertains particularly to a device for drawing off helical gears.

In the case of engines of some motor-vehicles, and sometimes with other engines, gears are mounted so close to the engine-base or to other parts, that it is difficult, and oftentimes impossible, to position hooks behind the gears for the purpose of pulling them off.

It is an object of the invention to provide a device having pulling-jaws so formed that, when machinery parts are crowded close together, they may be brought with facility into gripping relation with helical or other gear-teeth and caused to exert pulling action on the gear.

Further, it also is an object of the invention to provide a gear-puller having parts so arranged that they easily may be assembled and disassembled and packed in comparatively small space.

When considered with the description herein, the characteristics of the invention are apparent from the accompanying drawing, forming part hereof, wherein an embodiment of the invention is disclosed, for purposes of illustration.

Like reference-characters refer to corresponding parts in the views of the drawing, of which—

Fig. 1 is a side elevation;

Fig. 2 is a view of the head;

Fig. 3 is a view of one of the jaws.

The head of the device includes a central body portion 4 and alined arms 5 constituting cross-bars extending therefrom, and it is formed preferably of steel sufficiently strong to withstand the stresses and strains to which the device is subjected in use. The body of the head has a central screw-threaded opening 6, and the arms or cross-bars have series of openings 7.

A screw threaded bar or shaft 8 is turnable in the central opening 6 of the head, and it has a head 9 arranged to take a wrench or other turning-tool.

A nut 10 is turnable against a cross-bar of the head on the threaded shank 11 of a jaw member 12 and draws the jaw through one of the openings 7 of the head. Either two or four jaws, oppositely placed in openings 7 of the head in accordance with the size of the gear to be removed, may be used, and the shanks are movable longitudinally through the openings.

Each of the jaw members is widened and somewhat arcuate in its portion opposite to the head so that it conforms generally to the periphery of a gear, and it is formed with teeth 13 of shape and size corresponding to those of the gear to be removed and adapted to engage between the gear-teeth. It has also a terminal transverse flange 14 adapted to engage over the ends of the gear-teeth or to seat against the side of the gear. The gripping portions of the jaws are made as thin as practicable, when the strength they must have is considered, in order that they may be slipped into engagement with a gear without interference by other closely-adjacent parts.

When the number of jaws required for a particular gear have been engaged therewith, the shaft 8 is turned with its end against the gear-shaft, and the gear gradually is drawn off. Relative adjustment of the parts of the device to meet various situations that may be encountered easily may be made by turning either the shaft 8 or the nuts 10, or both, and thus the device may be accommodated to the pulling of gears on shafts having ends of somewhat widely varying distances therefrom. Moreover, when it is difficult to bring the jaws, while assembled on the head, into engagement with a gear, some or all of the jaws may be removed from the head, then placed in engagement with the gear, and then the head passed over the jaw shanks and the nuts 10 replaced.

Having thus described my invention, what I claim as new, and desire to secure by Letters Patent, is—

1. A pulling device comprising a head having a threaded central opening, a threaded bar turnable in said opening against the end of a shaft, pulling-jaws having threaded shanks extending through and longitudinally movable in openings of said head, and nuts on said shanks holding said jaws in association with the head, each of said jaws having widened arcuate gripping portions formed with teeth arranged to seat between teeth of a gear and a terminal transverse flange arranged to seat against ends of gear-teeth.

2. A gripping-jaw for gear-pullers having a widened arcuate gripping portion formed with teeth arranged to seat between teeth of a gear and having also a terminal transverse flange arranged to seat against ends of gear-teeth.

In testimony whereof I affix my signature this 10th day of April, 1926.

EDDIE G. CHIPMAN.